United States Patent Office 3,161,870
Patented Dec. 15, 1964

3,161,870
SYSTEM FOR INCREASING THE DETECTION RANGE OF A GROUP OF SEARCH RADARS
Peter H. Pincoffs, Severna Park, Md., assignor to the United States of America as represented by the Secretary of the Army
Filed May 6, 1963, Ser. No. 278,812
3 Claims. (Cl. 343—5)

This invention relates to a system for increasing the detection range of a group of search radars and more particularly to a coordinated group of search radars wherein the effective capture area is increased.

The effectiveness of air defense systems (particularly anti-missile systems) is strongly dependent upon the range at which they can first detect target presence, because this parameter determines the time available for target identification, threat evaluation, interceptor flight, etc. The detection range of a radar having a given receiver noise level is a function only of the amount of energy received from the target within the time available for detection. If target cross section and range are held fixed, this received energy is directly proportioned to both radiated average power and receiving antenna capture area and is inversely proportional to solid angle scan rate. Since the required solid angle scan rate is determined by the tactical situation, the received energy can be increased only by increasing the radiated average power or receiving antenna capture area or both. In many instances, however, it is not possible to increase these parameters sufficiently to obtain the desired detection performance. For example, in a mobile anti-missile system, total radiated power is limited by logistical considerations and single vehicle antenna size (and hence capture area) is limited by the vehicle mobility specifications.

In view of the above it is an object of this invention to increase the detection range of a group of search radars.

A further object of this invention is to increase the effective receiving antenna capture area of each radar in a group of radars.

A still further object of this invention is to provide a reduction in the power required for a given detection capability in a coordinated group of search radars.

Figure 1:
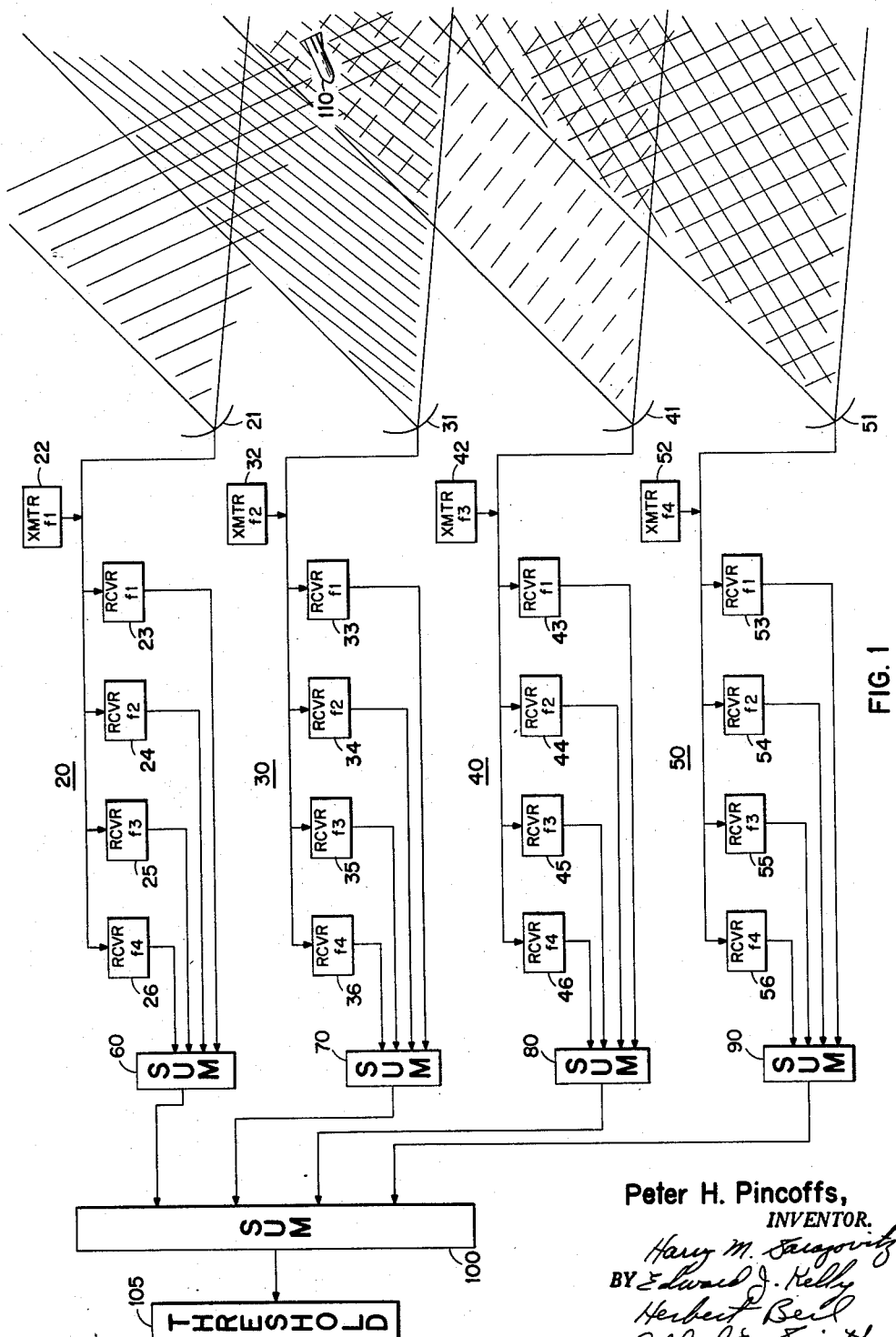
Figure 2:
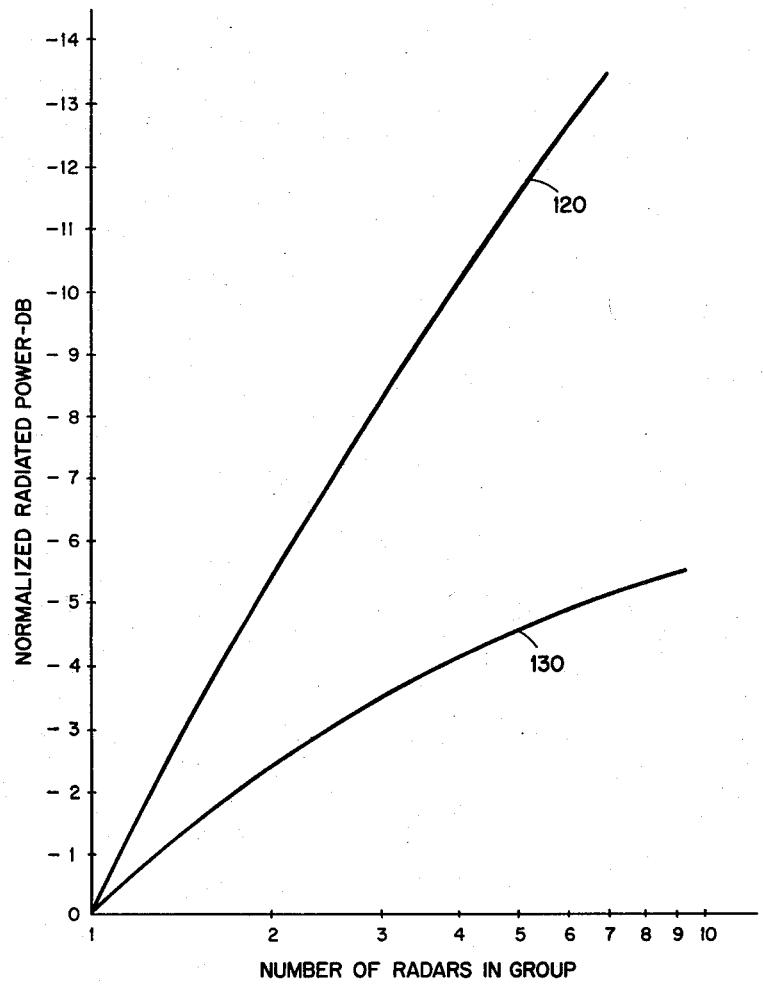

The foregoing and other objects and advantages of this invention will become more fully apparent from the following detailed description of this invention and from the accompanying drawings, in which:

FIGURE 1 illustrates a radar system, in block diagram, according to the invention; and FIGURE 2 illustrates the relationship between radiated power and the number of radars in a group.

A preferred embodiment of the invention is illustrated in FIGURE 1 wherein reference numerals 20, 30, 40 and 50 designate radars having antennas 21, 31, 41 and 51 for transmitting signals having different frequencies, $f_1$, $f_2$, $f_3$, and $f_4$, respectively. Each radar includes a single transmitter and a number of receivers equal to the total number of radars. For example, radar 20 has a transmitter 22 for radiating a signal having a frequency indicated by $f_1$, and receivers 23, 24, 25 and 26 tuned to receive frequencies indicated by $f_1$, $f_2$, $f_3$ and $f_4$, respectively. Each radar receives and uses the target echoes from the transmissions of all the other radars as well as that from its own transmitter. For example, if N transmissions are made using N different carrier frequencies, then N separate receivers tuned to each of these frequencies are present at each of the N radar sites, where N is a whole number greater than one.

Summing devices 60, 70, 80 and 90 are connected to each group of receivers, respectively, for non-coherently adding the outputs of the receiver groups. A summing device 100 is connected to the outputs of the summing devices 60, 70, 80 and 90 for obtaining a composite signal which is applied to a target detection threshold 105.

In order to realize the increased performance possible with the invention, antennas 21, 31, 41 and 51 must point in the same direction at the same time so as to allow the necessary multistatic reception. It is also required that the radars be sited near enough to each other that parallax between beams does not cause significant signal loss in the multistatic operation when target 110 is at long range. Reasonably close radar spacing is very desirable also to assure that the different echoes from the target all arrive at the same time so that they may be summed directly. If this close spacing is not realized delay networks are required between the different radars.

In operation of the system thermal noises appearing at the output of the receivers at each radar are statistically independent because the receivers are tuned to different frequencies. The output thermal noises of the identical receivers matched to a given frequency (one such receiver is at each radar) are independent both because the internal noise sources are independent and because the radar spatial separation decorrelates nearby external noise sources. The thermal noise outputs of all receivers in the system are, therefore, independent. Target echoes, however, are highly correlated because they appear essentially simultaneously at all receivers so that simple additions of the detected outputs yields either a signal-to-noise ratio improvement, or, alternatively, achievement of the same target detection performance with less radiated power.

The relationship between the power required and the number of radars is shown in FIGURE 2, wherein the power required related to the number of radars in the group, is expressed as the normalized radiated power per radar 120, and the normalized total radiated power of the group 130. In both cases, normalization is with respect to the radiated power which must be used in a single radar of the group in order for this one radar to have the same detection performance as the whole group. This performance level is arbitrarily chosen as 99 percent detection probability per look on a non-fluctuating target when the threshold is set to give a false alarm probability per look of about $10^{-6}$. It is seen that for two radars, the total radiated power needed is about 2.5 db less than that required of the equivalent performance single radar. That is, assuming equal transmitter efficiency in both cases, the two radars together require less than 60 percent of the prime power (and, hence fuel) needed by the single radar. In addition, a total search radar group weight saving is achieved in many instances, the amount depending upon the relative weights of the transmitter, antenna, and receiver mechanizations selected.

It is seen, therefore, that this invention allows a significant reduction in the power required for a given detection capability in a coordinated group of search radars. This reduction can be had at the price of a reasonable increase in system complexity.

While the invention has been described with reference to a preferred embodiment thereof, it will be apparent that various modifications and other embodiments thereof will occur to those skilled in the art within the scope of the invention. Accordingly, I desire the scope of my invention be limited only by the appended claims.

I claim:

1. A system for increasing the detection range of a group of search radars, said system comprising in combination:
   (a) a plurality of radar transmitters for radiating signals having different frequencies and positioned at different radar sites,
   (b) receiver means positioned at each of said radar sites for detecting target echoes, (c) each said receiver means having a number of separate receivers equal to the number of radar sites,
(d) said separate receivers of each receiver means being tuned to receive a target echo from a different transmitter, and
(e) means for non-coherently adding the outputs of all receivers for providing a composite echo signal.

2. A system for increasing the detection range of a group of search radars, said system comprising in combination:
(a) N transmitters positioned at N radar sites for radiating signals having different frequencies, where N is a whole number greater than one,
(b) N receivers positioned at each of said radar sites and operatively associated with each of said transmitters, said receivers each being tuned to receive a different target echo, whereby the target echoes of each transmitted signal are received at each radar site,
(c) means for non-coherently adding the outputs of all receivers to obtain a composite echo signal, and
(d) a detection threshold connected to said adding means.

3. A system for increasing the detection range of a group of search radars, said system comprising in combination:
(a) first, second, and third transmitters positioned at first, second and third radar sites,
(b) first, second and third receivers positioned at each radar site and operatively associated respectively with said first, second, and third transmitters, and
(c) means for non-coherently adding the outputs from all receivers and thereby obtaining a composite signal.

References Cited by the Examiner
UNITED STATES PATENTS

| | | | |
|---|---|---|---|
| 2,426,460 | 8/47 | Lewis | 343—100 |
| 2,682,048 | 6/54 | Longacre | 343—17.1 |
| 2,822,536 | 2/58 | Sandretto | 343—5 |
| 2,997,706 | 8/61 | Easy et al. | 343—5 |
| 3,017,630 | 1/62 | Begevich et al. | 343—17.1 |

CHESTER L. JUSTUS, *Primary Examiner.*